United States Patent [19]

Schreiber et al.

[11] 3,908,023

[45] Sept. 23, 1975

[54] IMPARTING CINNAMON-LIKE FLAVOR WITH CERTAIN 3-PHENYL PENTENAL ACETALS

[75] Inventors: William Lewis Schreiber, Jackson; Manfred Vock, Locust; John B. Hall, Rumson, all of N.J.; Edward Joseph Shuster, N.Y.; Alton Dewitt Quinn, Abrahamsville, Pa.

[73] Assignee: International Flavors & Fragrances Inc., New York, N.Y.

[22] Filed: Oct. 15, 1974

[21] Appl. No.: 514,951

Related U.S. Application Data

[63] Continuation-in-part of Ser. No. 276,922, Aug. 1, 1972, abandoned.

[52] U.S. Cl. ............... 426/536; 252/522; 260/611; 131/144
[51] Int. Cl.² .......................................... A23L 1/226
[58] Field of Search ....................................... 426/65

[56] References Cited
UNITED STATES PATENTS

| | | | |
|---|---|---|---|
| 3,582,360 | 1/1971 | van praag et al. | 426/65 |
| 3,636,113 | 1/1972 | Hall et al. | 260/566 R |
| 3,694,232 | 9/1972 | Hall et al. | 426/65 |
| 3,829,504 | 8/1974 | Hall et al. | 260/611 |

Primary Examiner—Joseph M. Golian
Attorney, Agent, or Firm—Arthur L. Liberman, Esq.; Harold Haidt, Esq.

[57] ABSTRACT

Foodstuff flavor and aroma augmenting compositions containing a quantity of at least one di-lower alkyl or lower alkylene acetal of a 3-phenyl pentenal sufficient to alter the aroma and/or organoleptic characteristics of said compositions, methods for preparing same, and foodstuff materials containing at least one of said acetals.

4 Claims, No Drawings

IMPARTING CINNAMON-LIKE FLAVOR WITH CERTAIN 3-PHENYL PENTENAL ACETALS

This application is a continuation-in-part of U.S. Application for Letters Patent No. 276,922 filed on Aug. 1, 1972 and now abandoned.

BACKGROUND OF THE INVENTION

The present invention relates to novel methods and compositions using certain acetals of 3-phenyl pentenals, a number of which are novel themselves, to alter the flavor and/or aroma of foodstuffs in the absence of intense hydrolytic conditions or act as precursors for free aldehydes in the presence of intense hydrolytic conditions which alter the flavor and/or or aroma of foodstuffs.

There has been considerable work performed relating to substances which can be used to impart flavors to various consumable materials. These substances are used to diminish natural materials some of which may be in short supply, and to provide more uniform properties in the finished product. Chocolate-spicey flavors and cinnamon flavors are particularly desirable for many uses in consumable articles.

3-Phenyl pentenals have been suggested in U.S. Pat. No. 3,694,232 for use in cocoa flavors whereby notes characteristic of milk chocolate are provided. 3-Phenyl-4-pentenal is indicated to cause the chocolate beverage to have a fuller, richer sweet milk chocolate flavor. U.S. Pat. No. 3,582,360 issued on June 1, 1971 discloses certain 2-phenyl-2-alkenals as being useful for preparing flavoring compositions and food compositions, particularly those having chocolate or cocoa flavors and/or aroma qualities. Thus, for example, the compound 5-methyl-2-phenyl-2-hexenal is indicated therein to alter imitation cocoa flavor so as to provide a more natural cocoa flavor and impart a character of bitter chocolate.

Acetals are shown to be useful in fragrance formulations at Column 2, lines 50–65 of U.S. Pat. No. 3,636,113. Such acetals have the structures:

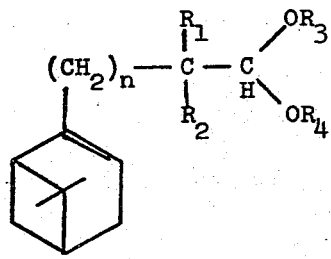

wherein $R_1$ and $R_2$ are either hydrogen or lower alkyl; wherein $R_3$ and $R_4$ are the same or different lower alkyl groups, and wherein n is 1 or 2 and lower alkylene cyclic acetals having the structure:

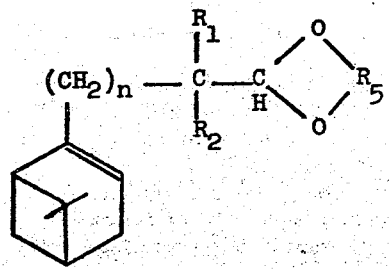

wherein $R_5$ is lower alkylene.

In U.S. Pat. No. 3,694,232 mentioned above, mention is made of the diethyl acetal of 3-phenyl-4-pentenal and the diethyl acetal of 3-phenyl-3-pentenal; but only as intermediates for producing 3-phenyl-3-pentenal and 3-phenyl-2-pentenal from 3-phenyl-4-pentenal.

In West et al. "Synthetic Perfumes: their Chemistry and Preparation", published by Edward, Arnold and Co., London, England, in 1949, on page 315, cinnamaldehyde dimethyl acetal is stated to "have a fine cinnamon-cassia odor which renders it useful in some Chanel-like fancy perfumes and in oriental types like Tabac Blond and Fleur de Tabac". Cinnamaldehyde diethyl acetal is also reported. These materials have the following structures:

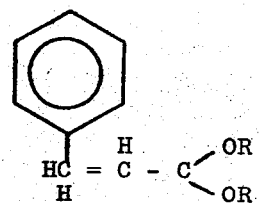

wherein R is methyl or ethyl.

Cinnamaldehyde diethyl acetal is reported in "Perfume and Flavor Chemicals (Aroma Chemicals)" by S. Arctander (published by the author in Montclair, New Jersey 11969) as having a "faint but fresh green slightly spicey oily sweet odor and a mild and oily sweet taste". Arctander goes on to state: "since this acetal — like most other acetals — is unstable under mildly acid conditions, it finds little if any use in flavor compositions". In addition, Arctander also reports cinnamaldehyde 2,4-dihydroxy-4-methylpentane acetal as "soft, tenacious, natural, cinnamon type odor not nearly as harsh as cinnamic aldehyde yet rich and lasting as aldehyde itself". Cinnamic aldehyde dimethyl acetal is also reported by Arctander and with reference to this acetal Arctander states: "It should be noted that pure, aldehyde-free acetal is practically colorless and carries little or no odor similarly to the aldehyde". The ethylene glycol acetal of cinnamic aldehyde is indicated by Arctander to be useful in flavor compositions, such as all spice, cassia, cinnamon, clove and various spice blend and it is stated by Arctander to have a sweet spicey cinnamon all spice taste not quite as sweet as the aldehyde. It should be noted that cinnamic aldehyde ethylene glycol acetal is on the GRAS list and has been given F.E.M.A. No. 2287.

The cinnamic aldehyde acetals of the prior art are not considered to impart certain desired qualities to foodstuffs which acetals of 3-phenyl-pentenals of this invention are capable of doing as more specifically described below.

The prior art cinnamic aldehyde acetal noted above, however, being unsaturated in a position alpha,beta- to the acetal moiety, are relatively unstable even in aqueous media compound with the 3-phenyl pentenals of the instant application, which can only be hydrolyzed under "intense hydrolytic conditions" which term is defined infra.

THE INVENTION

It has now been discovered that novel relatively stable solid and liquid foodstuff and flavoring compositions as well as novel aroma imparting compositions having cinnamon-like characteristics found in quality cinnamon may be provided by the utilization of certain compounds of the class of di-lower alkyl or lower alkylene acetals of 3-phenyl pentenals. A number of acetals of our invention under intense hydrolytic conditions such as ethylene acetals of the 3-phenyl pentenals will act as precursors in forming corresponding free aldehydes which are themselves capable of imparting cinnamon flavors. These "precursors" are uniquely useful in that they may be included, preferably, as part of a solid flavor or fragrance imparting composition which is capable of being stored for an indefinite period of time prior to use in a liquid foodstuff. At the point of ultimate use of the flavor or fragrance imparting material such higher molecular weight acetal is hydrolyzed due to the presence of other acidic constituents and/or an aqueous medium and due to the liquid phase of the material in which it is used. Thus, 3-phenyl pentenals contemplated for use in the practice of the present invention can also, for convenience, be represented according to the following structural formula:

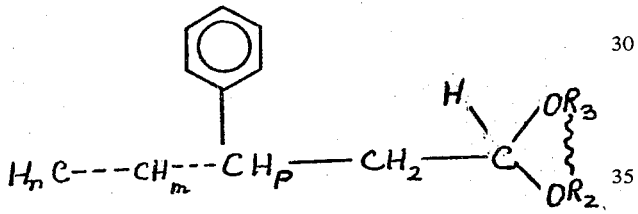

wherein one of the dashed lines is a carbon-carbon double bond and the other of the dashed lines is a carbon-carbon single bond; wherein $R_2$ and $R_3$ each represents methyl or ethyl; or $R_2$ and $R_3$ taken together represents ethylene; wherein when the dashed line at the "4,5" position is a double bond $n$ is 2, $m$ is 1 and $p$ is 1; wherein when the dashed line at the "3,4" position is a double bond $n$ is 3, $m$ is 1 and $p$ is 0.

Specific examples of compounds falling within the scope of the foregoing structural formula include, without necessary limitation, the following:

3-phenyl-3-pentenal dimethyl acetal;
3-phenyl-3-pentenal ethyl methyl acetal;
3-phenyl-4-pentenal diethyl acetal;
3-phenyl-3-pentenal diethyl acetal;
3-phenyl-4-pentenal dimethyl acetal;
3-phenyl-3-pentenal ethylene acetal;
3-phenyl-4-pentenal ethylene acetal; and
3-phenyl-4-pentenal ethyl methyl acetal As stated previously, the acetal derivatives of or 3-phenyl pentenals described herein are capable of supplying (in the absence of intense hydrolytic conditions) consistent and reproducible flavor and aroma notes usually lacking in many chocolate, cocoa and cinnamon food flavoring materials heretofore provided. Thus, the latter materials provided, prior to our discovery, characteristically may yield chocolate flavors and aromas which may be characterized as "thin" and "harsh" or may simply have "nutty" or "milk chocolate" notes without the nuances which lend cinnamon notes to chocolate or cocoa flavors. By way of contrast, the acetal derivatives of the 3-phenyl pentenals of the present invention provide, interalia, organoleptic impressions similar to those which are achieved by the addition of natural cinnamon to chocolate flavors.

The term "intense hydrolytic conditions" is intended herein to mean strongly acidic (pH less than 2.5) or strongly basic (pH greater than 11.5) media including foodstuffs wherein a major proportion of the acetal (more than 10% by weight) would be hydrolyzed to its corresponding aldehyde.

The lower alkyl acetals of 3-phenyl pentenals compounds covered by the foregoing formula are also represented as follows:

3-Phenyl-4-pentenal dialkyl acetals or alkylene acetals

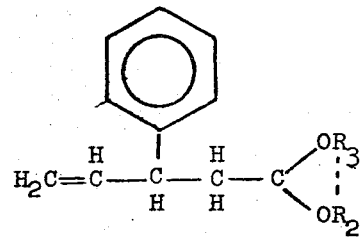

3-Phenyl-3-pentenal dialkyl acetals or alkylene acetals

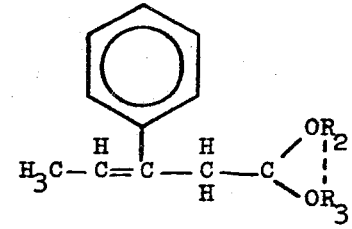

(wherein $R_2$ and $R_3$ are defined as above).

Examples of food flavor properties of th dilower alkyl and lower alkylene phenyl pentenal acetals which are preferred in the practice of the instant invention are as follows:

1. The dimethyl acetal of 3-phenyl-4-pentenal:
   Aroma: Cassia, cinnamon spice-like, with a "fresh green" balsamic nuance.
   Taste: At 5 ppm has a rosy, cinnamon taste. At 10 ppm has a cinnamon spice-like flavor with root-like backnotes. At 20 ppm has dominating cinnamon notes.
2. The diethyl acetal of 3-phenyl-4-pentenal:
   Aroma: Green, balsamic cinnamon-like spiciness.
   Taste: At 10 ppm has weak rosy notes and a slightly spice-like character with a sweet fruity nuance. Can also be described as having a cinnamon-like character.
3. The ethylene glycol acetal of 3-phenyl-4-pentenal:
   Aroma: Warm sweet cinnamon-spice-like and low keyed green notes with an earthy nuance reminiscent of cloves.
   Taste: At 10 ppm has a slight spice-like character reminiscent of cinnamon or cloves. At 1 and 2 ppm has a pleasant cinnamon bark taste. At 5 ppm has a cinnamon/cloves taste. At 30 ppm has a sweet, fruity, and note-like taste with mild pungency.

4. The dimethyl acetal of 3-phenyl-3-pentenal:
Aroma: Has a low-keyed green cinnamon note.

As used herein in regard to flavors, the term "alter" in its various forms means supplying or imparting a flavor character or note to an otherwise bland, relatively tasteless substance, or augmenting the existing flavor characteristic where a natural flavor is deficient in some regard, or supplementing the existing flavor impression to modify its quality, character or taste.

As used herein the term "foodstuff" includes both solid and liquid ingestible materials which usually do, but need not, have nutritional value. Thus, foodstuffs include meats, gravies, soups, convenience foods, beverages, dairy products, candies, vegetables, cereals, soft drinks, snacks and the like.

In many instances the optimum balance of flavor is obtained by utilizing (in the absence of intense hydrolytic conditions) mixtures of lower alkyl or di-lower alkyl acetal of 3-phenyl pentenals. Other mixtures may also include another type of phenyl alkenyl, e.g., a 2-phenyl-alkenal used to, in addition, supply a nutty note. Such mixtures may comprise, for example, the dimethyl acetal of 3-phenyl-4-pentenal; the free aldehyde 3-phenyl pentenal; and 2-phenyl-2-butenal. When mixtures of the acetals of the 3-phenyl pentenals taken together with other phenyl pentenals are used, their proportions with one another can be varied as desired to suite the particular foodstuff to be flavored and will depend upon whether the composition so formulated is utilized to supply a total organoleptic impression or to enhance or fortify an existing flavor and/or aroma characteristics.

The dialkyl and lower alkylene acetals of 3-phenyl pentenals contemplated for use in the practice of this invention can be synthesized by first reacting an appropriately substituted or unsubstituted 3-phenyl-propen-2-ol-1 and an appropriately substituted or unsubstituted alkyl vinyl ether. The reaction can take place using as a catalyst a protonic acid (such as phosphoric acid) thus forming, in one step, 3-phenyl-4-pentenal. The desired intermediate products can also be obtained using the aforementioned reactants but using a mercuric catalyst such as mercuric acetate (in place of the acid catalyst). Such a procedure is also described by Burgstaher J. Chem. Soc., 1963, pages 4986-9 (see paragraph 2 on page 4989). In addition, another such procedure is described in U.S. Pat. No. 3,694,232. If the 3-phenyl-4-pentenals are produced according to the above-mentioned procedures, the di-lower alkyl or lower alkylene acetals are preferably produced therefrom by reacting such mixtures with a lower alcohol or mixture of lower alcohols or with a lower alkylene glycol or mixture of lower alkylene glycols or mixture of lower alcohols and lower alkylene glycols in the presence of an acid catalyst such as paratoluene sulfonic acid, hydrochloric acid or a source therefor, such as acetyl chloride. 3-Phenyl pentenals (free aldehydes) may also be converted to the corresponding acetals by reaction with an appropriate orthoformate. Thus, for example, reaction of triethyl orthoformate with 3-phenyl-4-pentenal will give rise to the production of a good yield of the diethyl acetal of 3-phenyl-4-pentenal. Dialkyl acetals of 3-phenyl pentenals may also be formed by addition to the free aldehydes with 2,2-dimethoxy propane. Mixtures of an alkylene glycol such as ethylene glycol and an orthoformate such as triethyl orthoformate give rise to alkylene acetals.

In addition, when producing the aldehydes prior to the reaction with alcohol, or with the orthoformate to form the acetal, if only 3-phenyl-4-pentenals are formed then the carbon-carbon double bond in the pentenal moiety of the 3-phenyl-4-pentenal intermediate product, if desired, may be rearranged whereby the end product will turn out to be an acetal of a given 3-phenyl-3-pentenal. Thus, initially, the aldehyde moiety may be "stabilized" by treatment of the 3-phenyl-4-pentenal with an alcohol or a glycol such as methanol, ethanol, 1,2-propylene glycol, 1,3-propylene glycol, 1,2-butylene glycol, 1,3-butylene glycol, 1,4-butylene glycol, 2-methyl-1,3-propane diol or ethylene glycol. The resulting acetal of 3-phenyl-4-pentenal may then be retained and used as a tobacco, food flavor or fragrance adjuvant or it is treated with a base such as potassium t-butoxide whereby a 3-phenyl-3-pentenal acetal is formed. The resultant rearranged acetals may then, if desired, be purified by means of appropriate extraction and distillation so that they are usable as food flavor, fragrance or tobacco flavor adjuvants. The aforementioned reaction sequence is illustrated as follows:

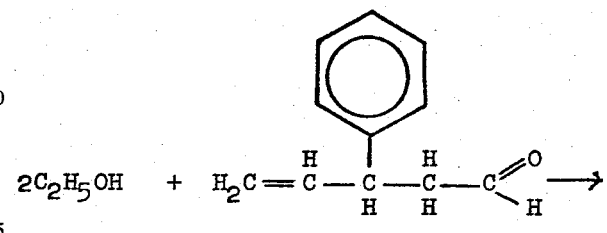

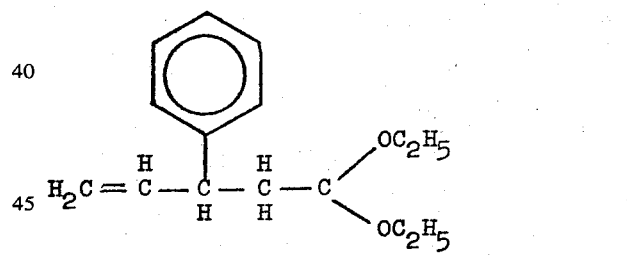

Base such as potassium t-butoxide

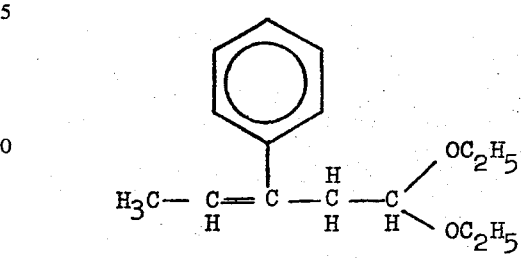

More particularly after they are produced in the aforementioned manner (e.g., as the 3-phenyl-4- pentenal mixtures or as the 3-phenyl-4-pentenals produced as indicated above or the alkyl and/or alkoxy substituted derivatives thereof), these free aldehydes are then reacted with a lower alcohol, or a mixture or lower alcohols or a lower alkylene glycol or a mixture of such glycols or a mixture of one or more lower alcohols and glycols in the presence of an acidic medium, for example, in the presence of hydrogen chloride or in the presence of a source of hydrogen chloride, such as acetyl chloride. If only 3-phenyl-4-pentenal di-lower alkyl acetals or lower alkylene glycol acetals are formed, such materials may be desired to be partially or entirely rearranged to 3-phenyl-3-pentenal di-lower alcohols or lower alkylene glycol acetals. Predictable mixtures of 3-phenyl-3-pentenal acetals and 3-phenyl-4-pentenal acetals may be produced if desired by shortening the time of reaction by means of prematurely neutralizing the base (e.g., potassium-t-butoxide) which is present in the reaction mass.

When the materials of this invention, the lower alkyl diacetals and lower alkylene acetals of 3-phenyl-pentenals are used as food flavor adjuvants, the nature of the co-ingredients included with the 3-phenyl pentenal lower dialkyl acetals or lower alkylene acetals in formulating the product composition will, i.e., as a foodstuff per se or alternatively as a flavoring composition adapted to be added to a foodstuff at some subsequent point of time. In any event, such compounds serve to alter the organoleptic characteristics of the ultimate foodstuff treated therewith.

Substances suitable for use herein as co-ingredients or flavoring adjuvants are well known in the art for such use being extensively described in the relevant literature. Apart from the requirement that any such material be "ingestibly" acceptacle, and thus non-toxic or otherwise non-deleterious, nothing particularly critical resides in the selection thereof. Accordingly, such materials, which may in general be characterized as flavoring adjuvants or vehicles comprise broadly, stabilizers, thickeners, surface active agents, conditioners, flavorants and flavor intensifiers.

Stabilizer compounds include preservatives, e.g., sodium chloride, antioxidants, e.g., calcium and sodium ascorbate, ascorbic acid, butylated hydroxyanisole (mixture of 2 and 3 tertiary butyl-4-hydroxyanisole), butylated hydroxy toluene (2,6-di-tertiarybutyl-4-methyl phenol), propyl gallate and the like, sequestrants, e.g., citric acid.

Thickener compounds include carriers, binders, protective colloids, suspending agents, emulsifiers and the like, e.g., agaragar; carrageenan; cellulose and cellulose derivatives such as carboxymethyl cellulose and methyl cellulose; natural and synthetic gums such as gum arabic, gum tragacanth; gelatin, proteinaceous materials; lipids, carbohydrates; starches, pectins, and emulsifiers, e.g., mono- and diglycerides of fatty acids, skim milk powder, hexoses, pentoses, disaccharides, e.g., sucrose, corn syrup solids and the like.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cochineal, tumeric and curcumin and the like; firming agents such as aluminum sodium sulfate, calcium chloride and calcium gluconate; texturizers; anti-caking agents, e.g., aluminum calcium sulfate and tribasic calcium phosphate, enzymes; yeast foods, e.g., calcium lactate and calcium sulfate; nutrient supplements, e.g., iron salts such as ferric phosphate, ferrous gluconate and the like, riboflavin, vitamins, zinc sources such as zinc chloride, zinc sulfate and the like.

Flavorants and flavor intensifiers include organic acids, e.g., fatty saturated acids, unsaturated acids and amino acids; alcohols, e.g., primary and secondary alcohols; esters, carbonyl compounds including aldehydes and ketones as well as lactones; cyclic organic materials including benzene derivatives; isocyclics; heterocyclics such as furans, particularly 2,5-dimethyl-3-acetyl furan, pyridines, pyrazines (particularly monoalkyl, dialkyl, trialkyl and tetraalkyl substituted pyrazines) and the like, sulfur-containing materials including thiazoles, disulfides, thiols, sulfides, aldehydes, (for example, 3-phenyl-4-pentenal, 3-phenyl-3-pentenal, 3-phenyl-2-pentenal, 2-phenyl-2-pentenal, and 2-phenyl-3-methyl-2-butenal; disulfides and the like; so-called flavor potentiators such as monosodium glutamate, guanylates, inosinates, natural and synthetic flavorants such as vanillin, ethyl vanillin, diacetyl, phenethyl-2-furoate, maltol, natural gums and the like; spices, herbs, essential oils and extractives including "bitterness principles" such as theobromin, caffein, naringin and other suitable materials creating a bitter effect.

The specific flavoring adjuvant selected for use may be either solid or liquid, depending upon the desired physical form of the ultimate product, i.e., foodstuff, whether simulated or natural, and should, in any event, be capable of providing an environment in which the 3-phenyl-pentenal di-lower alkyl acetals or lower alkylene acetals can be dispersed or admixed to provide a homogeneous medium. In addition, selection of one or more flavoring adjuvants as well as the quantities thereof will depend upon the precise organoleptic character desired in the finished product; thus, in the case of flavoring compositions, ingredient selection will vary in accordance with the foodstuff to which the flavor and aroma are to be imparted. In contradistinction, in the preparation of solid products, e.g., simulated foodstuffs, ingredients capable of providing normally solid compositions should be selected as various cellulose derivatives.

As will be appreciated by those skilled in the art, the amount of 3-phenyl pentenal di-lower alkyl acetals or lower alkylene acetals employed in a particular instance can vary over a relatively wide range whereby to achieve desired organoleptic effects having reference to the nature of the product. All parts and percentages given herein are by weight unless otherwise specified. Thus, correspondingly greater amounts would be necessary in those instances wherein the ultimate food composition to be flavored is relatively bland to the taste, whereas relatively minor quantities may suffice for purposes of enhancing a composition merely deficient in natural flavor or aroma. Thus, the primary requirement is that the amount selected to effective, i.e., sufficient to alter the organoleptic characteristics of the parent composition, whether foodstuff per se or flavoring composition. Thus, the use of insufficient quantities of the 3-phenyl pentenal di-lower alkyl acetals or lower alkylene acetals will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus, and with respect to ultimate food compositions, it is found that quantities of 3-phenyl pentenal di-lower alkyl acetals or lower alkylene acetals ranging from a small but effective amount, e.g., 1.0 part per million up to about 200 parts per million by weight based on total composition are suitable. Concentrations in excess of the maximum quantities stated are not normally recommended since they fail to provide commensurate enhancement of organoleptic properties. In those instances wherein the 3-phenyl pentenal di-lower alkyl acetals or lower alkylene acetals is added to the foodstuff as an integral component of a flavoring composition, it is, of course, essential that the total quantity of flavoring composition employed by sufficient to yield an effective 3-phenyl pentenal di-lower alkyl acetals or lower alkylene acetals concentration in the foodstuff product.

Food flavoring compositions prepared in accordance with the present invention preferably contain the 3-phenyl pentenal di-lower alkyl acetals or lower alkylene acetals in concentrations ranging from about 20 to 100% by weight, based on the total weight of said flavoring composition.

The compositions described herein can be prepared according to conventional techniques well known in the art for such purposes. Thus, liquid products as typified by cake batters, egg nog and chocolate milk can be formulated by merely admixing the involved ingredients within the proportions stated in a suitable blender, to obtain the desired consistency, homogeneity of dispersion, etc. Alternatively, flavoring compositions in the form of particulate solids can be conveniently prepared by admixing the 3-phenyl pentenal di-lower alkyl acetals or lower alkylene acetals with, for example, gum arabic, gum tragacanth, carrageenan and the like, and thereafter, spray-drying the resultant mixture whereby to obtain the particulate solid product. Pre-prepared flavor mixes in powder form, e.g., cocoa mix may be obtained by mixing the dried solid components, e.g., milk solids, sugar and the like and 3-phenyl pentenal di-lower alkyl acetals or lower alkylene acetals in a dry blender until the requisite degree of uniformity is achieved.

It is presently preferred to combine with the 3-phenyl pentenal di-lower alkyl acetals or lower alkylene acetals the following flavoring adjuvants Vanillin, Maltol, Benzaldehyde, and Isovaleraldehyde.

The following examples are given to illustrate embodiments of the invention as it is presently preferred to practice it. It will be understood that these examples are illustrative, and the invention is not to be considered as restricted thereto except as indicated in the appended claims.

EXAMPLE I

Preparation of 3-Phenyl-4-Pentenal Dimethyl Acetal

18 Grams of 3-phenyl-4-pentenal produced according to the procedure Burgstahler J. Chem. Soc. 1963, pages 1986-90 4986-is admixed with 16 grams of Linde 3A molecular sieves one-sixteenth inch pellets purchased from the Matheson, Coleman and Bell Co., East Rutherford, New Jersey, and combined with 115 ml of anhydrous methanol. In a separate flask, 1 ml of acetyl chloride is dissolved in 8 ml of methanol whereby an HCl-methanol solution is formed. The resulting HCl solution is then added to the 3-phenyl-4-pentenal solution (total volume: 125 ml). After a period of two hours, the resultant reaction mixture is decanted from the molecular sieves, evaporated and distilled at a pressure of 0.5 mm Hg and a temperature in the range of 72°–73°C. The distillate is 3-phenyl-4-pentenal dimethyl acetal.

The NMR data is as follows:

| ppm | | Interpretation | |
| --- | --- | --- | --- |
| 7.20 | (m) | 5H | Aryl protons |
| 6.20 – 5.76 | (m) | 1H | Olefinic proton |
| 5.10 – 4.94 | (m) | 2H | Olefinic protons |
| 4.21 | (t) | 1H | Acetal proton |
| 3.44 – 3.24 | (m) | 7H | Protons alpha to oxygen and aryl—CH— |
| 1.98 | (t) | 2H | Aryl—C—CH$_2$— |

EXAMPLE II

Preparation of 3-Phenyl-3-Pentenal Dimethyl Acetal

15 Grams of the 3-phenyl-4-pentenal dimethyl acetal produced in the immediately preceding example is dissolved in dimethyl sulfoxide (total volume 50 ml) and 1.5 grams of potassium-t-butoxide is added. The mixture is then stored at room temperature under a nitrogen blanket for a period of 1½ hours. The reaction mass is then diluted with 50 cc of water and is extracted with two 100 ml portions of diethyl ether. The diethyl ether is dried over anhydrous sodium sulfate and evaporated down. The resulting residue contains a 2:1 mixture of 3-phenyl-3-pentenal dimethyl acetal and 3-phenyl-4-pentenal dimethyl acetal. The resulting mixture is then retreated with potassium-t-butoxide in dimethyl sulfoxide and again worked up as above. Removal of solvent yields 14.9 grams of a quite mobile orange oil. The reaction product is distilled at 83°C and 0.1 mm Hg pressure in a concentric tube distillation apparatus, yielding 3-phenyl-3-pentenal dimethyl acetal.

The NMR data for this compound is as follows:

| ppm | | | Interpretation |
| --- | --- | --- | --- |
| 7.40 – 7.20 | (m) | 5H | Aryl protons |
| 5.80 | (q) | 1H | Aryl—C=C—CH$_3$ (H above) |
| 4.33 | (t) | 1H | Acetal proton |
| 3.24 | (s) | 6H | CH$_3$ — O — |
| 2.83 | (d) | 2H | Aryl—C—CH$_2$—O— (H above) |
| 1.82 | (d) | 3H | C=C—CH$_3$ |

EXAMPLE III

The following mixture is prepared:

| Ingredients | Parts by Weight |
|---|---|
| 3-Phenyl-4-pentenal dimethyl acetal produced according to the procedure of Example I | 3 |
| Cinnamic aldehyde | 8 |
| Orange oil | 3 |
| Oil of cloves | 1 |
| Phenyl ethyl alcohol | 5 |
| Ethyl alcohol | 80 |

The addition of the 3-phenyl-4-pentenal dimethyl acetal to this mixture imparts to the flavor a dominating full bodied long lasting cinnamon aroma so long as the pH range is between 2.5 and 11.5 (which range is not in the scope of intense hydrolytic conditions). Without the 3-phenyl-4-pentenal dimethyl acetal, the flavor formulation is bland, lacks body and requires approximately three times as much material when added to the standard cinnamon flavor powders for use in pastry powders and cake powders. The subject flavor formulation acts as an absolute long lasting replacement for cinnamon bark, Ceylon (Cortex cinnamoni ceylanici) when used as a flavor in baking under non-hydrolytic conditions). Thus, 420 grams of the above-mentioned flavor formulation are added to the following powder cake flavor oil which is then added at the rate of 0.25% to standard cake mix and appropriately baked:

| Mixture of Grams | |
|---|---|
| 27.5 | Ethyl vanillin |
| 126.0 | Vanillin |
| 66.0 | Oil of bitter almond |
| 420.0 | Oil of cinnamon bark |
| 66.0 | Oil of cloves |
| 33.0 | Oil of cardamon |
| 66.0 | Oil of nutmeg |
| 195.5 | Oil of lemon, cold pressed |
| 1000.0 – Total | |

EXAMPLE IV

Preparation of 3-Phenyl-4-Pentenal Diethyl Acetal

Into a 25 ml flask equipped with thermometer, magnetic stirrer and reflux condenser, the following materials are added:

| | |
|---|---|
| 3-phenyl-4-pentenal | 4.80 grams |
| Diethyl orthoformate | 6.00 grams |
| Absolute ethanol having dissolved therein hydrogen chloride (produced by adding 0.1 ml acetyl chloride to 10 ml of absolute ethanol) | 10 ml |

The mixture warms spontaneously within 5 minutes. After stirring for 1 hour the volatile materials are then evaporated and the residual material is distilled yielding 5.88 grams of a colorless material boiling at 68-70% at 0.1 mm Hg pressure. NMR, IR and mass spectral analyses indicate that this material is 97% 3-phenyl-4-pentenal diethyl acetal.

| ppm | | | Interpretations |
|---|---|---|---|
| 7.35 – 7.14 | (m) | 5H | Aromatic protons |
| 6.12 – 5.78 | (m) | 1H | Olefinic proton |
| 5.10 – 4.96 | (m) | 2H | Olefinic protons |
| 4.33 | (t) | 1H | Acetal proton |
| 3.75 – 3.32 | (m) | 4H | Protons alpha to oxygen |
| 2.00 | (t) | 1H | Aryl—C—CH$_2$—C (H, H) |
| 1.16 | (t) | 3H | CH$_3$—CH$_2$—O |
| 1.12 | (t) | 3H | CH$_3$—CH$_2$—O |

EXAMPLE V

Preparation of 3-Phenyl-4-Pentenal Ethylene Acetal

Into a 100 ml flask equipped with thermometer, water separator, stirrer and reflux condenser, the following materials are added:

| | |
|---|---|
| 3-Phenyl-4-pentenal | 8.00 grams |
| Ethylene glycol | 5.00 grams |
| Benzene | 40 ml |
| Paratoluene sulfonic acid | 0.5 grams |

The reaction mixture is refluxed until water is no longer evolved therefrom (1 hour). The reaction mixture is then transferred to a 250 ml separatory funnel and the heavier phase is discarded. The benzene phase is then washed with three 100 ml portions of saturated sodium bicarbonate. The resulting solution is then dried over anhydrous sodium sulfate and evaporated until a colorless oil residue is obtained. This residue is evaporated at 0.04 mm Hg pressure at a temperature of 79°-83°C yielding 5.51 grams of product. The product is confirmed by IR, NMR and mass spectral analyses as 3-phenyl-4-pentenal ethylene acetal having the structure:

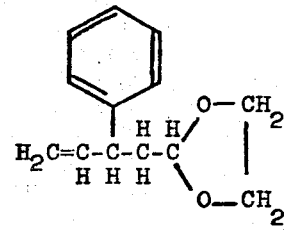

The NMR data for this compound is as follows:

| ppm | | | Interpretation |
|---|---|---|---|
| 7.24 | (m) | 5H | Aryl protons |
| 6.26 – 5.80 | (m) | 1H | Olefinic proton |
| 5.14 – 4.98 | (m) | 2H | Olefinic protons |
| 4.72 | (t) | 1H | Acetal proton |
| 4.00 – 3.74 | (m) | 4H | O—CH$_2$—CH$_2$—O — |
| 2.08 – 1.98 | (2 doublets) | 2H | Aryl—C—CH$_2$—C—O— |

EXAMPLE VI

A "cinnamon-like-butter" formulation is prepared by admixing the following ingredients:

| Ingredients | Parts by Weight |
|---|---|
| Butter | 10 |
| Sucrose | 2 |
| 3-Phenyl-4-pentenal dimethyl acetal produced according to the process of Example I | 3 |

The resulting formulation is spread on a three-eighths inch thick 1 ounce slice of Raisin bread at the rate of 1 part by weight formulation: 10 parts by weight bread. The resultant foodstuff is stored in a freezer for one month; then thawed and toasted at 420°F for a period of 20 seconds yielding a pleasantly cinnamon-tasting buttered rasin toast.

EXAMPLE VII

A "cinnamon-like-butter" formulation is prepared by admixing the following ingredients:

| Ingredients | Parts by Weight |
|---|---|
| Butter | 10 |
| Sucrose | 2 |
| 3-Phenyl-3-pentenal dimethyl acetal produced according to the process of Example II | 4 |

The resulting formulation is spread on a three-eighths inch thick one ounce slice of white bread at the rate of 1 part by weight formulation: 10 parts by weight bread. The resulting foodstuff is stored in a freezer for one month; then thawed and toasted at 420°F for a period of 20 seconds yielding a pleasantly cinnamon-tasting buttered white toast.

EXAMPLE VIII

A "cinnamon-like-butter" formulation is prepared by admixing the following ingredients:

| Ingredients | Parts by Weight |
|---|---|
| Butter | 12 |
| Sucrose | 5 |
| 3-Phenyl-4-pentenal diethyl acetal produced according to the process of Example IV | 3 |

The resulting formulation is spread on a one inch thick two ounce slice of raison bread at the rate of 1 part by weight formulation: 10 parts by weight bread. The resultant foodstuff is stored in a freezer for 1 month; then thawed and toasted at 420°F for a period of 20 seconds, yielding a pleasantly cinnamon-tasting buttered raisin toast.

EXAMPLE IX

A "cinnamon-like-butter" formulation is prepared by admixing the following ingredients:

| Ingredients | Parts by Weight |
|---|---|
| Butter | 10 |
| Sucrose | 2 |
| 3-Phenyl-4-pentenal ethylene acetal produced according to the process of Example V | 0.5 |

The resulting formulation is spread on a three-eighths inch thick 2 ounce slice of white bread at the rate of 1 part by weight formulation: 10 parts by weight bread. The resultant foodstuff is stored in a freezer for 1 month; then thawed and toasted at 420°F for a period of 20 seconds yielding a pleasantly cinnamon-tasting buttered white toast.

EXAMPLE X

A "cinnamon-like-butter" formulation is prepared by admixing the following ingredients:

| Ingredients | Parts by Weight |
|---|---|
| Butter | 10 |
| Sucrose | 2 |
| 3-Phenyl-4-pentenal diethyl acetal and 3-phenyl-3-pentenal dimethyl acetal (50:50 mixture | 0.4 |

The resulting formulation is spread on a one inch thick two ounces slice of raisin bread at the rate of 1 part by weight formulation: 10 parts by weight bread. The resultant foodstuff is stored in a freezer for 1 month; then thawed and toasted at 420°F for a period of 20 seconds yielding a pleasantly cinnamon-tasting buttered raisin toast.

EXAMPLE XI

A "cinnamon-like-butter" formulation is prepared by admixing the following ingredients:

| Ingredients | Parts by Weight |
|---|---|
| Margarine | 10 |
| -Undecalactone | 1 |
| Sucrose | 2 |
| 3-Phenyl-4-pentenal diethyl acetal produced according to the process of Example IV | 3 |

The resulting formulation is spread on a three-eighths inch thick 2 ounce slice of Westphalian Pumpernickel bread at the rate of 1 part by weight formulation: 10 parts by weight bread. The resultant foodstuff is stored in a freezer for 1 month; then thawed and toasted at 420°F for a period of 20 seconds yielding a pleasantly cinnamon-tasting buttered pumpernickel toast.

EXAMPLE XII

The following mixture is prepared:

| Ingredients | Parts by Weight |
|---|---|
| 3-Phenyl-3-pentenal dimethyl acetal produced according to the procedure of Example II | 4.5 |
| Cinnamic aldehyde | 8 |
| Orange oil | 3 |
| Oil of cloves | 1 |
| Phenyl ethyl alcohol | 5 |
| Ethyl alcohol | 80 |

The addition of the 3-phenyl-3-pentenal dimethyl acetal to this mixture imparts to the flavor a dominating full bodied long lasting cinnamon aroma so long as the pH range is between 2.5 and 11.5. Without the 3-phenyl-3-pentenal dimethyl acetal, the flavor formulation is bland, lacks body and requires approximately 2.5 times as much material when added to the standard cinnamon flavor powders for use in pastry powders and cake powders. The subject flavor formulation acts as an absolute long lasting replacement for cinnamon bark, Ceylon (Cortex cinnamoni Ceylanici) when used as a flavor in baking (under non-hydrolytic conditions). Thus, 420 grams of the above-mentioned flavor formulation are added to the following powder cake flavor oil which is then added at the rate of 0.30% to standard cake mix and appropriately baked:

| Mixture of Gram | |
|---|---|
| 27.5 | Ethyl vanillin |
| 126.0 | Vanillin |
| 66.0 | Oil of bitter almond |
| 420.0 | Oil of cinnamon bark |
| 66.0 | Oil of cloves |
| 33.0 | Oil of cardamom |
| 66.0 | Oil of nutmeg |
| 195.5 | Oil of lemon, cold pressed |
| 1000.0 – Total | |

EXAMPLE XIII

The following mixture is prepared:

| Ingredients | Parts by Weight |
|---|---|
| 3-Phenyl-4-pentenal diethyl acetal produced according to the procedure of Example IV | 4.5 |
| Cinnamic aldehyde | 8 |
| Orange oil | 3 |
| Oil of cloves | 1 |
| Phenyl ethyl alcohol | 5 |
| Ethyl alcohol | 80 |

The addition of the 3-phenyl-4-pentenal diethyl acetal to this mixture imparts to the flavor a dominating full bodied long lasting cinnamon aroma so long as the pH range is between 2.5 and 11.5. Without the 3-phenyl-4-pentenal diethyl acetal, the flavor formulation is bland, lacks body and requires approximately 3.5 times as much material when added to the standard cinnamon flavor powders for use in pastry powders and cake powders. The subject flavor formulation acts as an absolute long lasting replacement for cinnamon bark, Ceylon (Cortex cinnamoni ceylanici) when used as a flavor in baking (under non-hydrolytic conditions). Thus, 420 grams of the above-mentioned flavor formulation are added to the following powder cake flavor oil which is then added at the rate of 0.35% to standard cake mix and approximately baked:

| Mixture of Grams | |
|---|---|
| 27.5 | Ethyl vanillin |
| 126.0 | Vanillin |
| 66.0 | Oil of bitter almond |
| 420.0 | Oil of cinnamon bark |
| 66.0 | Oil of cloves |
| 33.0 | Oil of cardamom |
| 66.0 | Oil of nutmeg |
| 195.5 | Oil of lemon, cold pressed |
| 1000.0 – Total | |

EXAMPLE XIV

The following mixture is prepared:

| Ingredients | Parts by Weight |
|---|---|
| 3-Phenyl-4-pentenal ethylene acetal produced according to the procedure of Example V | 5.5 |
| Cinnamic Aldehyde | 8 |
| Orange oil | 3 |
| Oil of cloves | 1 |
| Phenyl ethyl alcohol | 5 |
| Ethyl alcohol | 80 |

The addition of 3-phenyl-4-pentenal ethylene acetal to this mixture imparts to the flavor a dominating full bodied long lasting cinnamon aroma so long as the pH range is between 2.5 and 11.5. Without the 3-phenyl-4-pentenal ethylene acetal, the flavor formulation is bland, lacks body and requires approximately two times as much material when added to the standard cinnamon flavor powders for use in pastry powders and cake powders. The subject flavor formulation acts as an absolute long lasting replacement for a cinnamon bark, Ceylon (Cortex cinnamoni ceylanici) when used as a flavor in baking (under non-hydrolytic conditions). Thus, 420 grams of the above-mentioned flavor formulation are added to the following powder cake flavor oil which is then added at the rate of 0.60% to standard cake mix and appropriately baked:

| Mixture of Grams | |
|---|---|
| 27.5 | Ethyl vanillin |
| 126.0 | Vanillin |
| 66.0 | Oil of Bitter almond |
| 420.0 | Oil of cinnamon bark |
| 66.0 | Oil of cloves |
| 33.0 | Oil of cardamom |
| 66.0 | Oil of nutmeg |
| 195.5 | Oil of lemon, cold pressed |
| 1000.0 – Total | |

What is claimed is:

1. A process for altering the organoleptic properties of a foodstuff which comprises adding to said foodstuff in the absence of intense hydrolytic conditions a small but effective amount to impart to said foodstuff a cinnamon-like aroma and taste of a 3-phenyl pentenal acetal having the structure:

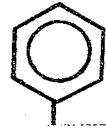
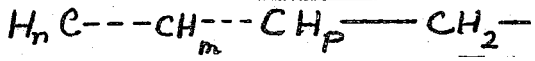
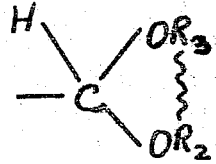

wherein one of the dashed lines is a carbon-carbon double bond and the other of the dashed lines is a carbon-carbon single bond; wherein $R_2$ and $R_3$ each represents methyl or ethyl; or $R_2$ and $R_3$ taken together represents ethylene; wherein when the dashed line at the "4,5" position is a double bond $n$ is 2, $m$ is 1 and $p$ is 1; wherein when the dashed line at the "3,4" position is a double bond $n$ is 3, $m$ is 1 and $p$ is 0.

2. The process of claim 1 wherein the 3-phenyl pentenal acetal is the dimethyl acetyl of 3-phenyl-4-pentenal.

3. The process of claim 1 wherein the 3-phenyl pentenal acetal is the diethyl acetal of 3-phenyl-4-pentenal.

4. The process of claim 1 wherein the 3-phenyl pentenal acetal is the ethylene glycol acetal of 3-phenyl-4-pentenal.

* * * * *